United States Patent
Shimozawa et al.

(10) Patent No.: US 11,500,301 B2
(45) Date of Patent: Nov. 15, 2022

(54) ELECTROPHOTOGRAPHIC PHOTOSENSITIVE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Hideharu Shimozawa, Shizuoka (JP); Kenichi Kaku, Shizuoka (JP); Tsutomu Nishida, Shizuoka (JP); Kazunori Noguchi, Shizuoka (JP); Akihiro Maruyama, Shizuoka (JP); Kaname Watariguchi, Kanagawa (JP); Takashi Anezaki, Kanagawa (JP); Haruyuki Tsuji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/154,529

(22) Filed: Jan. 21, 2021

(65) Prior Publication Data
US 2021/0240094 A1  Aug. 5, 2021

(30) Foreign Application Priority Data
Jan. 30, 2020 (JP) .............................. JP2020-014145

(51) Int. Cl.
*G03G 5/147* (2006.01)
*C08F 283/00* (2006.01)
*C08B 37/16* (2006.01)

(52) U.S. Cl.
CPC ..... *G03G 5/14791* (2013.01); *C08B 37/0012* (2013.01); *C08F 283/00* (2013.01); *G03G 5/14734* (2013.01); *G03G 5/14747* (2013.01); *G03G 2215/00957* (2013.01)

(58) Field of Classification Search
CPC ...... G03G 5/047; G03G 5/0539; G03G 5/071; G03G 2215/00957; G03G 2215/00518
See application file for complete search history.

(56) References Cited

FOREIGN PATENT DOCUMENTS

| JP | 2011248288 A |   | 12/2011 |
|----|--------------|---|---------|
| JP | 2012181244 A | * | 9/2012  |
| JP | 2012181244 A |   | 9/2012  |
| JP | 2019006941 A | * | 1/2019  |

OTHER PUBLICATIONS

"Machine Translation of publication # JP 2012181244 A" (Year: 2012).*
"Machine Translation of publication # JP 2019006941 A" (Year: 2019).*

* cited by examiner

*Primary Examiner* — Peter L Vajda
*Assistant Examiner* — Boone Alexander Evans
(74) *Attorney, Agent, or Firm* — Canon U.S.A., Inc. IP Division (57) ABSTRACT

An electrophotographic photosensitive member, which is suppressed in occurrence of fogging and is excellent in abrasion resistance. In the electrophotographic photosensitive member, an outermost surface layer of the electrophotographic photosensitive member comprises a polymerized product of a composition comprising at least a polyrotaxane and a monomer having a polymerizable reactive group, and a chain molecule of the polyrotaxane has two blocking groups at both terminals thereof, and a (meth)acryloyloxy group of a cyclic molecule of the polyrotaxane forms a bond.

6 Claims, 1 Drawing Sheet

ELECTROPHOTOGRAPHIC PHOTOSENSITIVE MEMBER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic photosensitive member, and a process cartridge and an electrophotographic image forming apparatus each comprising the electrophotographic photosensitive member.

Description of the Related Art

An electrophotographic photosensitive member comprising an organic photoconductive substance (charge-generating material) has been used as an electrophotographic photosensitive member to be mounted on each of a process cartridge and an electrophotographic image forming apparatus (hereinafter also referred to as "electrophotographic apparatus"). In recent years, an electrophotographic apparatus having a longer lifetime has been required, and hence it has been desired to provide an electrophotographic photosensitive member, which can be improved in image quality and abrasion resistance (mechanical durability), and can be suppressed in electric potential fluctuation.

A wide variety of investigations have heretofore been made for improving the image quality and abrasion resistance of an electrophotographic photosensitive member to be mounted on an electrophotographic apparatus. An example thereof is an investigation in which a self-recoverable resin is incorporated into the outermost surface layer of the electrophotographic photosensitive member to improve its abrasion resistance.

In each of Japanese Patent Application Laid-Open No. 2012-181244 and Japanese Patent Application Laid-Open No. 2011-248288, there is a description of an electrophotographic photosensitive member comprising a polyrotaxane in its outermost surface layer.

An investigation by the inventors has found that in the electrophotographic photosensitive member described in each of Japanese Patent Application Laid-Open No. 2012-181244 and Japanese Patent Application Laid-Open No. 2011-248288, a phenomenon called "fogging" in which a small amount of toner is developed in a portion on an image where no toner should be originally developed may occur. In addition, the performance of a durability test based on repeated use has found that the abrasion resistance of the electrophotographic photosensitive member may be insufficient.

SUMMARY OF THE INVENTION

Therefore, an aspect of the present disclosure is to provide an electrophotographic photosensitive member, which is suppressed in occurrence of fogging and is excellent in abrasion resistance.

The above-mentioned aspect is achieved by the present disclosure described below. That is, according to one aspect of the present disclosure, there is provided an electrophotographic photosensitive member comprising: a support; and a photosensitive layer arranged on the support, wherein an outermost surface layer of the electrophotographic photosensitive member comprises a polymerized product obtained by polymerization of a composition comprising a polyrotaxane and a monomer having a polymerizable reactive group, and wherein the polyrotaxane comprises chain molecules and cyclic molecules, the chain molecules each has two blocking groups at both terminals thereof, the cyclic molecules each has (meth)acryloyloxy groups, and the polymerized product comprises a crosslinked polyrotaxane obtained by the forming a bond of the (meth)acryloyloxy groups in the cyclic molecules of the polyrotaxane.

In addition, according to another aspect of the present disclosure, there is provided a process cartridge comprising: the electrophotographic photosensitive member; and at least one unit selected from the group consisting of a charging unit, a developing unit, and a cleaning unit, the process cartridge integrally supporting the electrophotographic photosensitive member and the at least one unit, and being removably mounted onto a main body of an electrophotographic image forming apparatus.

Further, according to another aspect of the present disclosure, there is provided an electrophotographic image forming apparatus comprising: the electrophotographic photosensitive member; and at least one unit selected from the group consisting of a charging unit, an exposing unit, a developing unit, and a transferring unit.

Further features of the present disclosure will become apparent from the following description of exemplary embodiments with reference to the attached drawings.

DESCRIPTION OF THE EMBODIMENTS

The present disclosure is described in detail below by taking an exemplary embodiment.

An electrophotographic photosensitive member (hereinafter also referred to as "photosensitive member") according to one aspect of the present disclosure is an electrophotographic photosensitive member comprising a support and a photosensitive layer arranged on the support, the photosensitive member being characterized in that the outermost surface layer of the electrophotographic photosensitive member comprises a polymerized product obtained by polymerization of a composition comprising a polyrotaxane and a monomer having a polymerizable reactive group, and that the polyrotaxane comprises chain molecules and cyclic molecules, the chain molecules each has two blocking groups at both terminals thereof, the cyclic molecules each has (meth)acryloyloxy groups, and the polymerized product comprises a crosslinked polyrotaxane obtained by the forming a bond of the (meth)acryloyloxy groups in the cyclic molecules of the polyrotaxane.

A method comprising incorporating a polyrotaxane into the outermost surface layer of a photosensitive member has heretofore been known as a technology for an improvement in abrasion resistance of the photosensitive member. However, an investigation by the inventors has found that the related art may cause fogging in an image. In addition, the performance of a durability test based on repeated use has found that the abrasion resistance obtained by the related art may be insufficient.

To solve the technical disadvantages that have occurred in the above-mentioned related art, the inventors have made investigations on a method of crosslinking the polyrotaxane to be incorporated into the outermost surface layer of the photosensitive member, and the content and material kind of the polyrotaxane. As a result of the investigations, the inventors have found that an electrophotographic photosensitive member, which is suppressed in occurrence of fogging and is excellent in abrasion resistance, is obtained by using an electrophotographic photosensitive member comprising a support and a photosensitive layer arranged on the support, the photosensitive member being characterized in that the outermost surface layer of the electrophotographic photosensitive member comprises a polymerized product obtained by polymerization of a composition comprising a polyrotaxane and a monomer having a polymerizable reactive group, and that the polyrotaxane comprises chain molecules and cyclic molecules, the chain molecules each has two blocking groups at both terminals thereof, the cyclic molecules each has (meth)acryloyloxy groups, and the polymerized product comprises a crosslinked polyrotaxane obtained by the forming a bond of the (meth)acryloyloxy groups in the cyclic molecules of the polyrotaxane.

The inventors have considered the following two mechanisms as mechanisms via which the above-mentioned technical disadvantages can be solved with such configuration.

A first mechanism is an effect exhibited by the movability of a crosslinking point of the polyrotaxane polymerized by a crosslinked structure (hereinafter referred to as "crosslinked polyrotaxane"), that is, a crosslinked cyclic molecule. The crosslinked polyrotaxane is obtained by the forming a bond of an acryloyloxy group and/or a methacryloyloxy group (hereinafter referred to as "(meth)acryloyloxy group") in cyclic molecules of the polyrotaxane, the crosslinked cyclic molecule can move along the chain molecule of the polyrotaxane. Accordingly, when an external stress is applied to the outermost surface layer of the photosensitive member, the crosslinked cyclic molecule moves along the chain molecule to disperse the stress, thereby exhibiting excellent stress dispersibility. Thus, the abrasion resistance of the photosensitive member is improved. In the outermost surface layer of a photosensitive member used in the related art in which polyrotaxane molecules are crosslinked to each other through a noncovalent bond, such as a bond based on a van der Waals force, like the electrophotographic photosensitive member described in Japanese Patent Application Laid-Open No. 2011-248288, the binding energy of the noncovalent bond is weak, and hence the bond is easily cleaved at the time of the application of an external stress to the outermost surface layer. As a result, the movability of the crosslinked cyclic molecule of the polyrotaxane is not exhibited, and hence stress dispersibility at the time of the application of the external stress to the outermost surface layer is lost. Accordingly, the abrasion resistance of the photosensitive member reduces. Meanwhile, in the outermost surface layer of a photosensitive member in which polyrotaxane molecules are crosslinked to each other through a covalent bond, the binding energy of the covalent bond is stronger than that of the noncovalent bond. However, when a crosslinked polyrotaxane obtained by repeated formation of a urethane bond between the polyrotaxane and an isocyanate compound is incorporated into the outermost surface layer like the electrophotographic photosensitive member described in Japanese Patent Application Laid-Open No. 2012-181244, urethane bonds are aggregated by a hydrogen bond, and hence the crosslinked cyclic molecule of the polyrotaxane cannot sufficiently exhibit its movability. Meanwhile, in the configuration of the present disclosure, the (meth)acryloyloxy groups in the cyclic molecule of the polyrotaxane form the bond, and hence the aggregation by a hydrogen bond is suppressed and the movability of the crosslinked cyclic molecule is maintained. As a result, the movability of the crosslinked cyclic molecule of the crosslinked polyrotaxane can be fully taken advantage of, and the fact leads to a further improvement in abrasion resistance.

A second mechanism is an effect exhibited by the application of negative charge from the photosensitive member to a developer. In a triboelectric series, an acrylic resin is positively charged more easily than a polyurethane resin or a polyester resin is. Accordingly, in the outermost surface layer of the photosensitive member of the present disclosure in which the (meth)acryloyloxy groups in the cyclic molecule of the polyrotaxane form the bond, negative charge is easily applied from the photosensitive member to the developer at the time of the development of the developer on the photosensitive member, and hence the occurrence of the developer charged to positive charge that is opposite in polarity to desired charge is suppressed. The inventors have assumed that when the occurrence of the positively charged developer is suppressed, the development of the developer in a non-electrostatic latent image region on the photosensitive member is prevented, and hence the occurrence of fogging is suppressed. In addition, the photosensitive member of the present disclosure described above comprises the outermost surface layer in which the movability of the crosslinked cyclic molecule of the crosslinked polyrotaxane is high. The inventors have considered that as a result of the foregoing, the bond obtained by the forming a bond of the (meth)acryloyloxy groups in the cyclic molecules of the polyrotaxane is allowed to more uniformly exist on the chain molecule by the high movability of the cyclic molecule, and hence the application of the negative charge from the photosensitive member to the developer is efficiently performed.

The inventors have considered that the effects of the present disclosure can be achieved via the foregoing mechanisms.

[Electrophotographic Photosensitive Member]

The electrophotographic photosensitive member according to one aspect of the present disclosure is characterized by comprising the support, the photosensitive layer, and the outermost surface layer. When the photosensitive member is a laminated photosensitive layer free of any protective layer, a charge-transporting layer corresponds to the outermost surface layer, and when the photosensitive member is a single-layer photosensitive layer, the single-layer photosensitive layer corresponds thereto. When the photosensitive member comprises a protective layer on the photosensitive layer, the protective layer corresponds to the outermost surface layer.

A method of producing the electrophotographic photosensitive member according to the one aspect of the present disclosure is, for example, a method involving: preparing coating liquids for the respective layers to be described later; applying the liquids in a desired order of the layers; and drying the liquids. In this case, examples of the method of applying the coating liquid include dip coating, spray coating, inkjet coating, roll coating, die coating, blade coating, curtain coating, wire bar coating, and ring coating. Of those, dip coating is preferred from the viewpoints of efficiency and productivity.

Now, the respective layers are described.

<Support>

In the present disclosure, the electrophotographic photosensitive member comprises a support. In the present disclosure, the support is preferably a conductive support having conductivity. In addition, examples of the shape of the support include a cylindrical shape, a belt shape, and a sheet shape. Of those, a cylindrical support is preferred. In addition, the surface of the support may be subjected to, for example, electrochemical treatment, such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, conductivity may be imparted to the resin or the glass through treatment involving, for example, mixing or coating the resin or the glass with a conductive material.

<Conductive Layer>

In the present disclosure, a conductive layer may be arranged on the support. The arrangement of the conductive layer can conceal a flaw and unevenness on the surface of the support, and can control the reflection of light on the surface of the support.

The conductive layer preferably comprises conductive particles and a resin.

A material for the conductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the conductive particles. In particular, titanium oxide, tin oxide, or zinc oxide is more preferably used.

When the metal oxide is used as the conductive particles, the surface of the metal oxide may be treated with a silane coupling agent or the like, or the metal oxide may be doped with an element such as phosphorus or aluminum, or an oxide thereof.

In addition, the conductive particles may each be of a laminated configuration comprising a core particle and a covering layer covering the surface. A material for the core particle includes, for example, titanium oxide, barium sulfate, or zinc oxide. A material for the covering layer includes, for example, a metal oxide, such as tin oxide.

In addition, when the metal oxide is used as the conductive particles, the volume-average particle diameter of the particles is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the conductive layer may further comprise, for example, a concealing agent, such as a silicone oil, a resin particle, or titanium oxide.

The average thickness of the conductive layer is preferably 1 to 50 μm, particularly preferably 3 to 40 μm.

The conductive layer may be formed by: preparing a coating liquid for a conductive layer comprising the above-mentioned respective materials and a solvent; forming a coating film of the coating liquid; and drying the coating film. Examples of the solvent to be used in the coating liquid include an alcohol-based solvent, a sulfoxide-based solvent, a ketone-based solvent, an ether-based solvent, an ester-based solvent, and an aromatic hydrocarbon-based solvent. A dispersion method for the dispersion of the conductive particles in the coating liquid for a conductive layer is, for example, a method including using a paint shaker, a sand mill, a ball mill, or a liquid collision-type high-speed dispersing machine.

<Undercoat Layer>

In the present disclosure, the undercoat layer may be arranged on the support or the conductive layer. The arrangement of the undercoat layer can improve an adhesive function between layers to impart a charge injection-inhibiting function.

The undercoat layer preferably comprises a resin. In addition, the undercoat layer may be formed as a cured film by polymerizing a composition comprising a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group of the monomer having the polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further comprise an electron-transporting material, a metal oxide, a metal, a conductive polymer, and the like for the purpose of improving electric characteristics. Of those, an electron-transporting material and a metal oxide are preferably used.

Examples of the electron-transporting material include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting material having a polymerizable functional group may be used as the electron-transporting material and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further comprise an additive.

The undercoat layer has an average thickness of preferably 0.1 to 50 μm, more preferably 0.2 to 40 μm, particularly preferably 0.3 to 30 μm.

The undercoat layer may be formed by: preparing a coating liquid for an undercoat layer comprising the above-mentioned respective materials and a solvent; forming a coating film of the coating liquid; and drying and/or curing the coating film. Examples of the solvent to be used in the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photosensitive member is mainly classified into (1) a laminated photosensitive layer and (2) a single-layer photosensitive layer. (1) The laminated photosensitive layer comprises a charge-generating layer comprising a charge-generating material and a charge-transporting layer comprising a charge-transporting material. (2) The single-layer photosensitive layer comprises a photosensitive layer comprising both of the charge-generating material and the charge-transporting material.

(1) Laminated Photosensitive Layer

The laminated photosensitive layer comprises the charge-generating layer and the charge-transporting layer.

(1-1) Charge-Generating Layer

The charge-generating layer preferably comprises the charge-generating material and a resin.

Examples of the charge-generating material include an azo pigment, a perylene pigment, a polycyclic quinone pigment, an indigo pigment, and a phthalocyanine pigment. Of those, an azo pigment and a phthalocyanine pigment are preferred. Of the phthalocyanine pigments, an oxytitanium phthalocyanine pigment, a chlorogallium phthalocyanine pigment, and a hydroxygallium phthalocyanine pigment are preferred.

The content of the charge-generating material in the charge-generating layer is preferably 40 to 85 mass %, more preferably 60 to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further comprise an additive, such as an antioxidant or a UV absorber. Specific examples thereof include a hindered phenol compound, a hindered amine compound, a sulfur compound, a phosphorus compound, and a benzophenone compound.

The average thickness of the charge-generating layer is preferably 0.1 to 1 µm, more preferably 0.15 to 0.4 µm.

The charge-generating layer may be formed by: preparing a coating liquid for a charge-generating layer comprising the above-mentioned respective materials and a solvent; forming a coating film of the coating liquid; and drying the coating film. Examples of the solvent to be used in the coating liquid include an alcohol-based solvent, a sulfoxide-based solvent, a ketone-based solvent, an ether-based solvent, an ester-based solvent, and an aromatic hydrocarbon-based solvent.

(1-2) Charge-Transporting Layer

The charge-transporting layer preferably comprises the charge-transporting material and a resin.

Examples of the charge-transporting material include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting material in the charge-transporting layer is preferably 25 to 70 mass %, more preferably 30 to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. As the polyester resin, a polyarylate resin is particularly preferred.

A content ratio (mass ratio) between the charge-transporting material and the resin is preferably from 4:10 to 20:10, more preferably from 5:10 to 12:10.

In addition, the charge-transporting layer may comprise an additive, such as an antioxidant, a UV absorber, a plasticizer, a leveling agent, a lubricity-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The average thickness of the charge-transporting layer is preferably 5 to 50 µm, more preferably 8 to 40 µm, particularly preferably 10 to 30 µm.

The charge-transporting layer may be formed by: preparing a coating liquid for a charge-transporting layer comprising the above-mentioned respective materials and a solvent; forming a coating film of the coating liquid; and drying the coating film. Examples of the solvent to be used in the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

Compounds represented by the formula (CTM-1) to the formula (CTM-10) are given below as examples of a compound that may be suitably used as the charge-transporting material.

(CTM-1)

(CTM-2)

-continued (CTM-3)

(CTM-4)

(CTM-5)

(CTM-6)

(CTM-7)

-continued (CTM-8)

(CTM-9)

(CTM-10)

(2) Single-Layer Photosensitive Layer

The single-layer photosensitive layer may be formed by: preparing a coating liquid for a photosensitive layer comprising the charge-generating material, the charge-transporting material, a resin, and a solvent; forming a coating film of the coating liquid; and drying the coating film. The charge-generating material, the charge-transporting material, and the resin are the same as the examples of the materials in the above-mentioned section "(1) Laminated Photosensitive Layer".

<Protective Layer>

In the present disclosure, a protective layer is preferably arranged on the photosensitive layer. The arrangement of the protective layer can improve the durability of the photosensitive member.

The protective layer preferably comprises conductive particles and/or the charge-transporting material, and a resin.

Examples of the conductive particles include metal oxide particles, such as titanium oxide, zinc oxide, tin oxide, and indium oxide.

Examples of the charge-transporting material include a polycyclic aromatic compound, a heterocyclic compound, a hydrazone compound, a styryl compound, an enamine compound, a benzidine compound, a triarylamine compound, and a resin having a group derived from any of those substances. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, an acrylic resin is preferred.

In addition, the protective layer may be formed as a cured film by polymerizing a composition comprising a monomer having a polymerizable functional group. A reaction at that time includes, for example, a thermal polymerization reaction, a photopolymerization reaction, or a radiation polymerization reaction. Examples of the polymerizable functional group of the monomer having the polymerizable functional group include an acrylic group and a methacrylic group. A material having a charge-transporting ability may be used as the monomer having the polymerizable functional group.

The protective layer may comprise an additive, such as an antioxidant, a UV absorber, a plasticizer, a leveling agent, a lubricity-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protective layer has an average thickness of preferably 0.5 to 10 μm, more preferably 1 to 7 μm.

The protective layer may be formed by: preparing a coating liquid for a protective layer comprising the above-mentioned respective materials and a solvent; forming a coating film of the coating liquid; and drying and/or curing the coating film. Examples of the solvent to be used in the coating liquid include an alcohol-based solvent, a ketone-based solvent, an ether-based solvent, a sulfoxide-based solvent, an ester-based solvent, and an aromatic hydrocarbon-based solvent.

<Outermost Surface Layer>

The present disclosure is characterized in that a polyrotaxane having a specific structure is incorporated into the outermost surface layer of the electrophotographic photosensitive member comprising the support and the photosensitive layer arranged on the support. With regard to the outermost surface layer, an outermost surface layer comprising a polymerized product obtained by polymerization of a polyrotaxane described below and/or a monomer having a polymerizable reactive group may be formed by: preparing a composition for an outermost surface layer comprising at least the polyrotaxane and the monomer having a polymerizable reactive group in the coating liquid for a charge-transporting layer or the coating liquid for a protective layer; forming a coating film of the composition; and drying and/or curing the coating film.

The content of the polyrotaxane is preferably 1 to 40 mass % with respect to the total mass of the composition for the outermost surface layer. At this time, the content of the polyrotaxane represents the content of a structure derived from the polyrotaxane in the outermost surface layer. When the content is set within the range, a suppressing effect on the occurrence of fogging and an improving effect on the abrasion resistance of the photosensitive member, which are exhibited by the incorporation of the polyrotaxane, are sufficiently exhibited.

The polyrotaxane according to the present disclosure is described in detail below.

<Polyrotaxane>

The polyrotaxane refers to a molecule in which a chain molecule penetrates through the inside of the ring of a cyclic molecule, the chain molecule is comprised with the cyclic molecule, and blocking groups are arranged at both terminals of the chain molecule so that the cyclic molecule may not be liberated. Herein, the phrase "the chain molecule is comprised with the cyclic molecule" (hereinafter sometimes referred to as "inclusion") refers to a state in which the chain molecule penetrates through the inside of the ring of the cyclic molecule.

Figure 2:
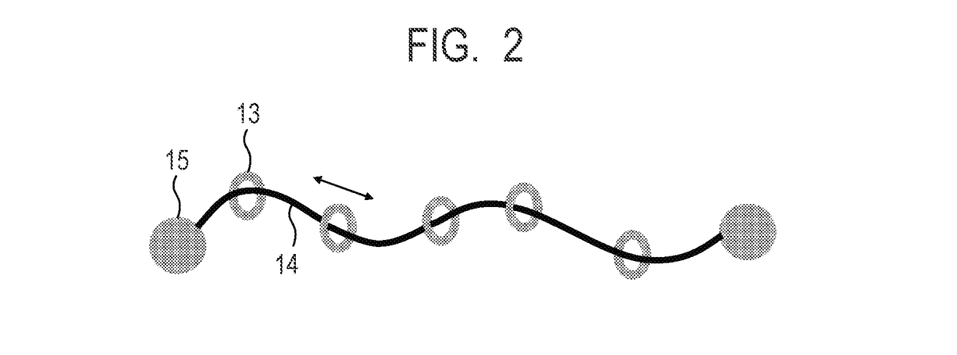
FIG. 2 is a conceptual view of a polyrotaxane in the outermost surface layer of the electrophotographic photosensitive member of the present disclosure.

In FIG. 2, a chain molecule 14 penetrates through the inside of each of the rings of cyclic molecules 13, and the cyclic molecules 13 can move along the chain molecule 14. In addition, blocking groups 15 are present in both end portions of the chain molecule 14, and hence the cyclic molecules 13 do not escape from the chain molecule 14.

<Chain Molecule of Polyrotaxane>

The chain molecule for forming part of the polyrotaxane is not particularly limited as long as the molecule is a molecule or a substance, which is comprised with the cyclic molecule and can be integrated without through any covalent bond, and the molecule is of a chain shape. In the present disclosure, the term "chain molecule" refers to molecules comprising a polymer, and all other substances each satisfying the requirements.

In addition, in the present disclosure, the term "chain" of the term "chain molecule" means that the molecule is substantially of a chain shape. That is, the chain molecule may have a branched chain as long as the cyclic molecule can rotate, and the cyclic molecule can move under a state of comprising the chain molecule. In addition, the chain molecule may be bent or may be of a helical shape as long as the cyclic molecule can move under a state of comprising the chain molecule. In addition, the length of the "chain" is not particularly limited as long as the cyclic molecule can move under a state of comprising the chain molecule.

Examples of the chain molecule may include: hydrophilic polymers, such as polyethylene glycol, polypropylene glycol, polytetrahydrofuran, polyvinyl alcohol, polyvinylpyrrolidone, poly(meth)acrylic acid, a cellulose-based resin (e.g., carboxymethyl cellulose, hydroxyethyl cellulose, or hydroxypropyl cellulose), polyacrylamide, polyethylene oxide, a polyvinyl acetal-based resin, polyvinyl methyl ether, polyamine, polyethyleneimine, casein, gelatin, and starch, and/or copolymers thereof; hydrophobic polymers, such as a polyolefin-based resin, for example, polyethylene, polypropylene, or a copolymer resin with another olefin-based monomer, a polyester resin, a polyvinyl chloride resin, a polystyrene-based resin, for example, polystyrene or an acrylonitrile-styrene copolymer resin, an acrylic-based resin, for example, polymethyl methacrylate, a (meth)acrylic acid ester copolymer, or an acrylonitrile-methyl acrylate copolymer resin, a polycarbonate resin, a polyurethane resin, a vinyl chloride-vinyl acetate copolymer resin, and a polyvinyl butyral resin; and derivatives thereof. Further, examples of the hydrophobic polymer include polyisoprene, polyisobutylene, polybutadiene, and polydimethylsiloxane.

The chain molecule has a weight-average molecular weight of 1,000 to 1,000,000, preferably 3,000 to 500,000, more preferably 5,000 to 300,000.

Both the terminals of the chain molecule each preferably have a reactive group for facilitating a reaction with the blocking group to be described later. Examples of the reactive group may include a hydroxy group, an amino group, a carboxyl group, and a thiol group, though a preferred reactive group depends on the blocking group to be used.

<Cyclic Molecule of Polyrotaxane>

Any cyclic molecule may be used as the cyclic molecule as long as the molecule can include the above-mentioned chain molecule.

In the present disclosure, the term "cyclic molecule" refers to various cyclic substances comprising a cyclic molecule. The term "cyclic molecule" refers to a molecule or a substance that is substantially cyclic. The phrase "substantially cyclic" means that a molecule having a ring that is not completely closed is also comprised, and a molecule having, for example, such a helical structure that one end of the molecule and the other end thereof are not bonded to each other, but overlap each other is also comprised therein.

The cyclic molecule is not particularly limited, and examples thereof may include various cyclic molecules obtained by introducing a (meth)acryloyloxy group into cyclodextrin molecules (e.g., α-cyclodextrin molecule, β-cyclodextrin molecule, γ-cyclodextrin molecule, dimethylcyclodextrin molecule, glucosylcyclodextrin molecule, and derivatives thereof), a crown ether molecule, a benzocrown ether molecule, a dibenzocrown ether molecule, and a dicyclohexanocrown ether molecule, and derivatives thereof (e.g., 2-hydroxyethyl-18-crown-6-ether molecule, 2-hydroxyethyl-15-crown-5-ether molecule, and dibenzo-24-crown-8-ether molecule). Hereinafter, the name of the cyclic molecule is referred to based on the name of the molecules into which the (meth)acryloyloxy group is introduced.

The above-mentioned cyclodextrins and crown ethers, and the like have different ring sizes of cyclic molecules depending on their kinds. Therefore, the cyclic molecule to be used may be selected in accordance with, for example, the structure of the chain molecule to be used, and the polarity or ionicity of the chain molecule.

The polyrotaxane is preferably a polyrotaxane using a polyethylene glycol as a chain molecule and using α-cyclodextrin as a cyclic molecule. The polyethylene glycol and α-cyclodextrin are relatively easily available, and α-cyclodextrin has an excellent ability to include the polyethylene glycol. Accordingly, the polyrotaxane formed from those components is a material, which has a high mechanical strength and is suitable for the expression of the effects of the present disclosure.

The cyclic molecule has a reactive group on the outside of its ring. A (meth)acryloyloxy group is used as the reactive group.

<Blocking Groups of Polyrotaxane>

The blocking groups are arranged at both the terminals of the chain molecule. Herein, the blocking groups may be any groups comprising a low-molecular weight group and a high-molecular weight group as long as the cyclic molecule does not desorb from the polyrotaxane.

Each of the blocking groups includes, for example, a bulky group that physically prevents the cyclic molecule from escaping from the chain molecule. In addition, each of the blocking groups includes, for example, a group having such ionicity that the ionicity of the blocking group and the ionicity of the cyclic molecule repel each other to electrically prevent the cyclic molecule from escaping from the chain molecule.

Specific examples of the block group may include a dinitrophenyl group, such as a 2,4-dinitrophenyl group or a 3,5-dinitrophenyl group, cyclodextrin, an adamantyl group, a trityl group, a fluoresceinyl group, and a pyrenyl group, and derivatives thereof.

<Method of Preparing Crosslinked Polyrotaxane>

First, the cyclic molecule and the chain molecule are mixed to prepare a pseudo-polyrotaxane in which the chain molecule penetrates through the inside of the ring of the cyclic molecule. The pseudo-polyrotaxane refers to a molecule having a polyrotaxane structure in which both the terminals of the chain molecule are not sealed with the blocking groups.

The number of the cyclic molecules through which the chain molecule is penetrated may be controlled in accordance with, for example, the time period for which the cyclic molecules and the chain molecule are mixed, and the molecular weight of the chain molecule. It is desired that the chain molecule should not be included with the cyclic molecules too densely. When the chain molecule is not included with the cyclic molecules too densely, the degree of freedom of the mobility of the cyclic molecules with respect to the chain molecule is maintained, and hence an outermost surface layer having both of excellent flexibility and excellent restorability can be obtained.

Next, the polyrotaxane is prepared by arranging the blocking groups at both the terminals of the chain molecule so that the cyclic molecule may not desorb from the pseudo-polyrotaxane obtained in the foregoing. The resultant polyrotaxane is polymerized through a (meth)acryloyloxy group of the cyclic molecule. Thus, the crosslinked polyrotaxane is obtained by the forming a bond of the (meth)acryloyloxy groups in the cyclic molecules of the polyrotaxane, thereby providing a crosslinked polyrotaxane.

When the (meth)acryloyloxy group forms the bond through the polymerization, the group is not necessarily required to form the bond with a (meth)acryloyloxy group of another cyclic molecule of the polyrotaxane, and may form the bond with a monomer or a resin having a polymerizable reactive group. A method for the formation of the bond by the polymerization of the (meth)acryloyloxy group includes, for example, a thermal polymerization reaction, a photopolymerization reaction, or a radiation polymerization reaction. The monomer or the resin having a polymerizable reactive group that forms the bond with the (meth)acryloyloxy group of the cyclic molecule of the polyrotaxane is not particularly limited as long as the monomer or the resin forms the bond with the (meth)acryloyloxy group through a thermal polymerization reaction, a photopolymerization reaction, a radiation polymerization reaction, or the like. Of such monomers and resins, a monomer or a resin having a (meth)acryloyloxy group or a (meth)acryloyl group as a polymerizable reactive group is preferred, and an example thereof is trimethylolpropane tri(meth)acrylate.

[Process Cartridge and Electrophotographic Image Forming Apparatus]

A process cartridge of the present disclosure is characterized in that the process cartridge integrally supports the electrophotographic photosensitive member that has heretofore been described, and at least one unit selected from the group consisting of a charging unit, a developing unit, a transferring unit, and a cleaning unit, and is removably mounted onto the main body of an electrophotographic image forming apparatus.

In addition, the electrophotographic image forming apparatus of the present disclosure is characterized by comprising the electrophotographic photosensitive member that has heretofore been described, a charging unit, an exposing unit, a developing unit, and a transferring unit.

Figure 1:
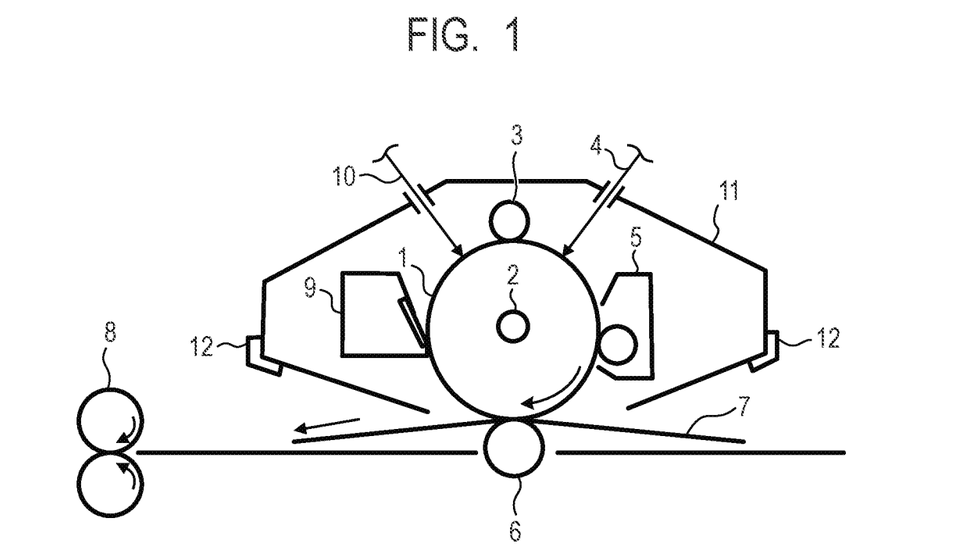
FIG. 1 is a view for illustrating an example of the schematic configuration of an electrophotographic image forming apparatus comprising a process cartridge comprising an electrophotographic photosensitive member of the present disclosure.

An example of the schematic construction of an electrophotographic image forming apparatus comprising a process cartridge comprising an electrophotographic photosensitive member is illustrated in FIG. 1.

A cylindrical electrophotographic photosensitive member 1 is rotationally driven about a shaft 2 in an arrow direction at a predetermined peripheral speed. The surface of the electrophotographic photosensitive member 1 is charged to a predetermined positive or negative potential by a charging unit 3. Although a roller charging system based on a roller type charging member is illustrated in the figure, a charging system such as a corona charging system, a proximity charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to treatment for fixing the toner image, and is printed out to the outside of the electrophotographic image forming apparatus. The electrophotographic image forming apparatus may include a cleaning unit 9 for removing a deposit, such as the toner remaining on the surface of the electrophotographic photosensitive member 1 after the transfer. In addition, a so-called cleaner-less system configured to remove the deposit with the developing unit or the like without separate arrangement of the cleaning unit may be used. The electrophotographic image forming apparatus may include an electricity-removing mechanism configured to subject the surface of the electrophotographic photosensitive member 1 to electricity-removing treatment with pre-exposure light 10 from a pre-exposing unit (not shown). In addition, a guiding unit 12, such as a rail, may be arranged for removably mounting a process cartridge 11 of the present disclosure onto the main body of an electrophotographic image forming apparatus.

The electrophotographic photosensitive member of the present disclosure may be used in, for example, a laser beam printer, an LED printer, a copying machine, a facsimile, and a multifunctional peripheral thereof.

According to the present disclosure, the electrophotographic photosensitive member, which is suppressed in occurrence of fogging and is excellent in abrasion resistance, can be provided. In addition, according to another aspect of the present disclosure, the process cartridge and the electrophotographic image forming apparatus each comprising the electrophotographic photosensitive member, which is suppressed in occurrence of fogging and is excellent in abrasion resistance, can be provided.

EXAMPLES

The present disclosure is described in more detail below by way of Examples and Comparative Examples. The present disclosure is by no means limited to the following Examples, and various modifications may be made without departing from the gist of the present disclosure. In the description in the following Examples, "part(s)" is by mass unless otherwise specified.

Synthesis Example 1: Synthesis of Polyrotaxane AOPR20-1 Whose Cyclic Molecule has Acryloyloxy Group (Activation of Both Terminals of Chain Molecule)
100 Grams of a polyethylene glycol (hereinafter also represented as "PEG"; weight-average molecular weight: 20,000) was dissolved in 500 mL of methylene chloride, and the solution was placed under an argon atmosphere. 20 Grams of 1,1-carbonyldiimidazole was added to the solution, and the mixture was stirred under the argon atmosphere at room temperature for 24 hours to cause the polyethylene glycol and 1,1-carbonyldiimidazole to react with each other.

The reaction product obtained in the foregoing was poured into diethyl ether stirred at high speed. The mixture was left at rest for 1 hour, and then the liquid comprising a precipitate was centrifuged so that the precipitate was removed. Thus, 90 g of a product was obtained.

The resultant product was dissolved in 500 mL of methylene chloride, and the solution was dropped in 500 mL of ethylenediamine over 3 hours. After the dropping, the mixture was stirred for 1 hour. The resultant reaction product was subjected to a rotary evaporator so that methylene chloride was removed. After that, the residue was dissolved in 1 liter of water, and the solution was loaded into a dialysis tube (molecular weight cutoff: 8,000), followed by dialysis in water for 7 days.

The resultant dialysate was dried with a rotary evaporator. Further, the dried product was dissolved in 500 mL of methylene chloride, and the solution was added to 1 liter of diethyl ether to perform reprecipitation. The precipitate was removed from the liquid comprising the precipitate by centrifugation, and was dried in a vacuum at a temperature of 40° C. for 2 hours to provide 68 g of a product in which 2-aminocarbamoyloxy groups were introduced into both terminals of the PEG.

(Preparation of Pseudo-Polyrotaxane)
The following compounds were added to 40 mL of water having a temperature of 80° C., and were stirred and mixed to be dissolved therein.

| | |
|---|---|
| α-Cyclodextrin | 3.5 g |
| PEG having 2-aminocarbamoyloxy groups introduced into both terminals thereof (weight-average molecular weight: 20,000) | 14.0 g |

The resultant solution was cooled, and was left at rest at a temperature of 5° C. for 16 hours. A white paste-like precipitate was produced, and hence the formation of a pseudo-polyrotaxane was recognized. The precipitate was subjected to freeze-drying treatment so that its moisture was removed. Thus, the pseudo-polyrotaxane was prepared.

(Preparation of Polyrotaxane)
13.7 Grams of the pseudo-polyrotaxane obtained in the foregoing and a solution obtained by dissolving the following compounds in 102.2 mL of dry dimethylformamide (DMF) were mixed, and were caused to react with each other under argon sealing at a temperature of 5° C. for 24 hours.

| | |
|---|---|
| Diisopropylethylamine | 2.6 mL |
| Adamantaneacetic acid | 2.9 g |
| 1-Hydroxybenzotriazole | 2.1 g |
| Benzotriazol-1-yloxytris(dimethylamino)phosphonium hexafluorophosphate (BOP reagent) | 6.2 g |

After that, 75 mL of methanol was added to the mixture, and the whole was centrifuged. Further, the resultant was washed with a solvent, which was obtained by mixing equal amounts of methanol and DMF, and 100 mL of methanol twice each, and was subjected to a centrifugation operation, followed by vacuum drying. The resultant solid was dissolved in 75 mL of dimethyl sulfoxide (DMSO), and the solution was dropped in 500 mL of water to produce a precipitate. Centrifugation was performed to remove the supernatant. Further, the residue was washed with 200 mL of water and 200 mL of methanol, and was centrifuged, followed by vacuum drying. Thus, 5.0 g of a polyrotaxane (PR20) having both terminals blocked with adamantyl groups was obtained.

(Polyrotaxane Modification (i) Hydroxypropylation)

5.0 Grams of the polyrotaxane (PR20) obtained in the foregoing was dissolved in 70 mL of a 1 N aqueous solution of NaOH, and 45 g of a large excess amount of propylene oxide was added to the solution. The mixture was stirred at room temperature for 24 hours, and was then neutralized with hydrochloric acid. The solution was dialyzed with a dialysis tube (molecular weight cutoff: 12,000) for 48 hours under running tap water. Further, the dialysate was dialyzed in 500 mL of purified water for 3 hours; the dialysis was performed twice. The dialysate was freeze-dried. The yield of the resultant product (HAPR20) was 4.9 g.

(Polyrotaxane Modification (ii) Introduction of Polycaprolactone Group)

1.0 Gram of the product (HAPR20) obtained in the foregoing was loaded into a three-necked flask, and 4.5 g of ε-caprolactone was introduced into the flask while nitrogen was slowly flowed. The mixture was uniformly stirred with a mechanical stirring machine at 100° C. for 30 minutes. After that, the reaction temperature was increased to 130° C., and 0.016 g of tin 2-ethylhexanoate (50 wt % solution) diluted with ethyl acetate in advance was added to the mixture. The contents were caused to react with each other for 5 hours to provide 5.5 g of a reaction product (HAPR20-g-PCL).

(Polyrotaxane Modification (iii) Introduction of Acryloyloxy Group)

5.5 Grams of the reaction product (HAPR20-g-PCL) obtained in the foregoing was dissolved in 2.5 g of ethyl acetate. 0.46 Gram of 2-acryloyloxyethyl isocyanate was dropped in the solution, and the contents were caused to react with each other at 80° C. for 4 hours. It was recognized by IR measurement that the peak of an isocyanate group (2,270 $cm^{-1}$) was consumed. Thus, a 70 wt % solution of a reaction product (polyrotaxane whose cyclic molecule had an acryloyloxy group, AOPR20-1) in ethyl acetate was obtained.

Synthesis Example 2: Synthesis of Polyrotaxane MOPR20 Whose Cyclic Molecule has Methacryloyloxy Group 5.5 Grams of the reaction product (HAPR20-g-PCL) obtained in Synthesis Example 1 was dissolved in 2.5 g of ethyl acetate. 0.46 Gram of 2-methacryloyloxyethyl isocyanate was dropped in the solution, and the contents were caused to react with each other at 80° C. for 4 hours. It was recognized by IR measurement that the peak of an isocyanate group (2,270 $cm^{-1}$) was consumed. Thus, a 70 wt % solution of a reaction product (polyrotaxane whose cyclic molecule had a methacryloyloxy group, MOPR20) in ethyl acetate was obtained.

Synthesis Example 3: Synthesis of Polyrotaxane AOPR05 Whose Cyclic Molecule has Acryloyloxy Group In Synthesis Example 1, the weight-average molecular weight of the polyethylene glycol was changed to 5,000. A polyrotaxane AOPR05 whose cyclic molecule had an acryloyloxy group was obtained in the same manner as in Synthesis Example 1 except the foregoing.

Synthesis Example 4: Synthesis of Polyrotaxane AOPR35 Whose Cyclic Molecule has Acryloyloxy Group In Synthesis Example 1, the weight-average molecular weight of the polyethylene glycol was changed to 35,000. A polyrotaxane AOPR35 whose cyclic molecule had an acryloyloxy group was obtained in the same manner as in Synthesis Example 1 except the foregoing.

Synthesis Example 5: Synthesis of Polyrotaxane AOPR20-2 Whose Cyclic Molecule has Acryloyloxy Group In Synthesis Example 1, the chain molecule was changed from the polyethylene glycol (weight-average molecular weight: 20,000) to a polypropylene glycol (weight-average molecular weight: 5,000), and the cyclic molecule was changed from α-cyclodextrin to β-cyclodextrin. A polyrotaxane AOPR20-2 whose cyclic molecule had an acryloyloxy group was obtained in the same manner as in Synthesis Example 1 except the foregoing.

Synthesis Example 6: Synthesis of Polyrotaxane AOPR20-3 Whose Cyclic Molecule has Acryloyloxy Group In Synthesis Example 5, β-cyclodextrin was changed to γ-cyclodextrin. A polyrotaxane AOPR20-3 whose cyclic molecule had an acryloyloxy group was obtained in the same manner as in Synthesis Example 5 except the foregoing.

Synthesis Example 7: Synthesis of Polyrotaxane AOPR20-4 Whose Cyclic Molecule has Acryloyloxy Group In Synthesis Example 5, the chain molecule was changed from the polypropylene glycol (weight-average molecular weight: 5,000) to a polybutadiene having a hydroxy group at each of both terminals thereof (weight-average molecular weight: 2,800). A polyrotaxane AOPR20-4 whose cyclic molecule had an acryloyloxy group was obtained in the same manner as in Synthesis Example 5 except the foregoing.

Example 1

<Production of Electrophotographic Photosensitive Member>

An aluminum cylinder (JIS-A3003, aluminum alloy) having a diameter of 24 mm and a length of 257 mm was used as a support (conductive support).

Next, the following materials were prepared.

| | |
|---|---|
| Titanium oxide ($TiO_2$) particles coated with oxygen-deficient tin oxide ($SnO_2$), the particles serving as metal oxide particles (average primary particle diameter: 230 nm) | 214 parts |
| A phenol resin (monomer/oligomer of a phenol resin) (product name: PLYOPHEN J-325, manufactured by Dainippon Ink & Chemicals, Inc., resin solid content: 60 mass %) serving as a binding material | 132 parts |
| 1-Methoxy-2-propanol serving as a solvent | 98 parts |

Those materials were loaded into a sand mill using 450 parts of glass beads each having a diameter of 0.8 mm, and were subjected to dispersion treatment under the conditions of a number of revolutions of 2,000 rpm, a dispersion treatment time of 4.5 hours, and a set temperature of cooling water of 18° C. to provide a dispersion liquid. The glass beads were removed from the dispersion liquid with a mesh (aperture: 150 μm). Silicone resin particles (product name: TOSPEARL 120, manufactured by Momentive Performance Materials Inc., average particle diameter: 2 μm) serving as a surface roughness-imparting agent were added to the resultant dispersion liquid. The addition amount of the silicone resin particles was set to 10 mass % with respect to the total mass of the metal oxide particles and the binding material in the dispersion liquid after the removal of the glass beads. In addition, a silicone oil (product name: SH28PA, manufactured by Dow Corning Toray Co., Ltd.) serving as a leveling agent was added to the dispersion liquid so that its addition amount became 0.01 mass % with respect to the total mass of the metal oxide particles and the binding material in the dispersion liquid. Next, a mixed solvent of methanol and 1-methoxy-2-propanol (mass ratio: 1:1) was added to the dispersion liquid so that the total mass of the metal oxide particles, the binding material, and the surface roughness-imparting agent (i.e., the mass of a solid content) in the dispersion liquid became 67 mass % with respect to the mass of the dispersion liquid. After that, the mixture was stirred to prepare a coating liquid for a conductive layer. The coating liquid for a conductive layer was applied onto the support by dip coating, and the applied liquid was heated for 1 hour at 140° C. to form a conductive layer having a thickness of 30 μm.

Next, the following materials were prepared.

| | |
|---|---|
| Electron-transporting material represented by the following formula (E-1) | 3.11 parts |
| Block isocyanate (product name: SBB-70P, manufactured by Asahi Kasei Corporation) | 6.49 parts |
| Styrene-acrylic resin (product name: UC-3920, manufactured by Toagosei Co., Ltd.) | 0.40 part |
| Zinc(II) hexanoate (manufactured by Mitsuwa Chemicals Co., Ltd.) serving as a catalyst | 0.05 part |

Those materials were dissolved in a mixed solvent of 48 parts of 1-butanol and 24 parts of acetone. 1.8 Parts of a silica slurry dispersed in isopropyl alcohol (product name: IPA-ST-UP, manufactured by Nissan Chemical Industries, Ltd., solid content concentration: 15 mass %, viscosity: 9 mPa·s) was added to the solution, and the mixture was stirred for 1 hour. After that, the mixture was filtered under pressure with a Teflon (trademark) filter manufactured by Advantec (product name: PF020). The resultant coating liquid for an undercoat layer was applied onto the conductive layer by dip coating, and the applied liquid was heated for 40 minutes at 170° C. to form an undercoat layer having a thickness of 0.7 μm.

Next, 10 parts of hydroxygallium phthalocyanine of a crystal form having peaks at positions of 7.5° and 28.4° in a chart obtained by its CuKα characteristic X-ray diffraction and 5 parts of a polyvinyl butyral resin (product name: S-LEC BX-1, manufactured by Sekisui Chemical Co., Ltd.) were prepared. Those materials were added to 200 parts of cyclohexanone, and were dispersed therein with a sand mill apparatus using glass beads each having a diameter of 0.9 mm for 6 hours. 150 Parts of cyclohexanone and 350 parts of ethyl acetate were further added to the dispersion liquid to dilute the dispersion liquid. Thus, a coating liquid for a charge-generating layer was obtained. The resultant coating liquid was applied onto the undercoat layer by dip coating, and was dried at 95° C. for 10 minutes to form a charge-generating layer having a thickness of 0.20 μm.

The measurement of X-ray diffraction was performed under the following conditions.

[Powder X-Ray Diffraction Measurement]

Measurement apparatus used: X-ray diffraction apparatus RINT-TTRII, manufactured by Rigaku Corporation

X-ray tube bulb: Cu
Tube voltage: 50 KV
Tube current: 300 mA
Scan method: 2θ/θ scan
Scan speed: 4.0°/min
Sampling interval: 0.02°
Start angle (2θ): 5.0°
Stop angle (2θ): 40.0°
Attachment: standard sample holder
Filter: not used
Incident monochrome: used
Counter monochrometer: not used
Divergent slit: open
Divergent longitudinal restriction slit: 10.00 mm
Scattering slit: open
Light receiving slit: open
Flat sheet monochrometer: used
Counter: scintillation counter Next, the following materials were prepared.

| | |
|---|---|
| Compound represented by the following structural formula (M-1) | 9 parts |
| Compound represented by the following structural formula (M-2) | 9 parts |
| 70 wt % solution of AOPR20-1 in ethyl acetate | 1.5 parts |
| Siloxane-modified acrylic compound (product name: BYK-3550, manufactured by BYK Japan KK) | 0.2 part |
| Compound represented by the following structural formula (I) (1-hydroxy-cyclohexyl-phenyl-ketone) | 1 part |

(E-1)

(M-1)

(M-2)

(I)

Those materials were dissolved in a mixed solvent of 36 parts of 2-propanol and 4 parts of tetrahydrofuran to prepare a coating liquid for a charge-transporting layer.

The coating liquid for a charge-transporting layer was applied onto the charge-generating layer by dip coating to form a coating film, and the resultant coating film was dried for 6 minutes at 50° C. After that, in the air, the coating film was irradiated with UV light from an electrodeless lamp H BULB (manufactured by Heraeus K.K.) for 2.0 seconds under the condition of a lamp intensity of 0.4 W/cm$^2$ while the support (irradiation target body) was rotated at a speed of 300 rpm. Next, in the air, the coating film was naturally cooled until its temperature became 25° C. After that, heating treatment was performed for 1 hour under such a condition that the temperature of the coating film became 120° C., thereby forming a charge-transporting layer having a thickness of 15 μm. Thus, an electrophotographic photosensitive member of Example 1 was produced.

Example 2

A conductive layer, an undercoat layer, and a charge-generating layer were each formed in the same manner as in Example 1.

Next, the following materials were prepared.

| | |
|---|---|
| Charge-transporting material represented by the structural formula (CTM-1) | 6 parts |
| Charge-transporting material represented by the structural formula (CTM-4) | 3 parts |
| Charge-transporting material represented by the structural formula (CTM-2) | 1 part |
| Polycarbonate (product name: Iupilon Z400, manufactured by Mitsubishi Engineering-Plastics Corporation) | 10 parts |

Polycarbonate resin having a copolymer unit of the following structural formula (C-1) and the following structural formula (C-2)

0.02 part(x/y=0.95/0.05: viscosity-average molecular weight=20,000)

(C-1)

(C-2)

Those materials were dissolved in a mixed solvent of 25 parts of orthoxylene, 25 parts of methyl benzoate, and 25 parts of dimethoxymethane to prepare a coating liquid for a charge-transporting layer. The coating liquid for a charge-transporting layer was applied onto the charge-generating layer by dip coating to form a coating film, and the coating film was dried for 30 minutes at 120° C. to form a charge-transporting layer having a thickness of 18 μm.

Next, the following materials were prepared.

| | |
|---|---|
| Compound represented by the structural formula (M-1) | 9 parts |
| Compound represented by the structural formula (M-2) | 9 parts |
| 70 wt % solution of AOPR20-1 in ethyl acetate | 1.5 parts |
| Siloxane-modified acrylic compound (product name: BYK-3550, manufactured by BYK Japan KK) | 0.2 part |
| Compound represented by the structural formula (I) | 1 part |

Those materials were dissolved in a mixed solvent of 72 parts of 2-propanol and 8 parts of tetrahydrofuran to prepare a coating liquid for a protective layer.

The coating liquid for a protective layer was applied onto the charge-transporting layer by dip coating to form a coating film, and the resultant coating film was dried for 6 minutes at 50° C. After that, in the air, the coating film was irradiated with UV light from an electrodeless lamp H BULB (manufactured by Heraeus K.K.) for 2.0 seconds under the condition of a lamp intensity of 0.4 W/cm$^2$ while the support (irradiation target body) was rotated at a speed of 300 rpm. Next, in the air, the coating film was naturally cooled until its temperature became 25° C. After that, heating treatment was performed for 1 hour under such a condition that the temperature of the coating film became 120° C., thereby forming a protective layer having a thickness of 3 μm. Thus, an electrophotographic photosensitive member of Example 2 was produced.

Example 3

A conductive layer, an undercoat layer, a charge-generating layer, and a charge-transporting layer were each formed in the same manner as in Example 2. A coating liquid for a protective layer was prepared in the same manner as in Example 2 except that 1 part of the compound represented by the structural formula (I) was not used.

The coating liquid for a protective layer was applied onto the charge-transporting layer by dip coating to form a coating film, and the resultant coating film was dried for 4 minutes at 35° C. After that, under a nitrogen atmosphere, the coating film was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the heating of the coating film was performed by increasing its temperature from 25° C. to 137° C. over 10 seconds. An oxygen concentration during a period from the electron beam irradiation to the subsequent heating treatment was 10 ppm or less. Next, in the air, the coating film was naturally cooled until its temperature became 25° C., and heating treatment was performed for 10 minutes under such a condition that the temperature of the coating film became 100° C., thereby forming a protective layer having a thickness of 3 µm. Thus, an electrophotographic photosensitive member of Example 3 was produced.

Example 4

In Example 3, the polyrotaxane used in the protective layer was changed from the AOPR20-1 to the MOPR20. An electrophotographic photosensitive member of Example 4 was produced in the same manner as in Example 3 except the foregoing.

Example 5

In Example 4, the amount of the MOPR20 used in the protective layer was changed from 1.5 parts to 6 parts. In addition, the amount of the compound represented by the structural formula (M-1) was changed from 9 parts to 6.5 parts. An electrophotographic photosensitive member of Example 5 was produced in the same manner as in Example 4 except the foregoing.

Example 6

In Example 3, the amount of the AOPR20-1 used in the protective layer was changed from 1.5 parts to 0.3 part, and the amount of the compound represented by the structural formula (M-1) was changed from 9 parts to 10 parts. An electrophotographic photosensitive member of Example 6 was produced in the same manner as in Example 3 except the foregoing.

Example 7

In Example 3, the amount of the AOPR20-1 used in the protective layer was changed from 1.5 parts to 11.5 parts, and the amount of the compound represented by the structural formula (M-1) was changed from 9 parts to 3 parts. An electrophotographic photosensitive member of Example 7 was produced in the same manner as in Example 3 except the foregoing.

Example 8

In Example 3, the polyrotaxane used in the protective layer was changed from the AOPR20-1 to the AOPR05. An electrophotographic photosensitive member of Example 8 was produced in the same manner as in Example 3 except the foregoing.

Example 9

In Example 3, the polyrotaxane used in the protective layer was changed from the AOPR20-1 to the AOPR35. An electrophotographic photosensitive member of Example 9 was produced in the same manner as in Example 3 except the foregoing.

Example 10

In Example 3, the polyrotaxane used in the protective layer was changed from the AOPR20-1 to the AOPR20-2. An electrophotographic photosensitive member of Example 10 was produced in the same manner as in Example 3 except the foregoing.

Example 11

In Example 3, the polyrotaxane used in the protective layer was changed from the AOPR20-1 to the AOPR20-3. An electrophotographic photosensitive member of Example 11 was produced in the same manner as in Example 3 except the foregoing.

Example 12

In Example 3, the polyrotaxane used in the protective layer was changed from the AOPR20-1 to the AOPR20-4. An electrophotographic photosensitive member of Example 12 was produced in the same manner as in Example 3 except the foregoing.

Example 13

In Example 3, the compound represented by the structural formula (M-1) was changed to a compound represented by the following structural formula (M-3). An electrophotographic photosensitive member of Example 13 was produced in the same manner as in Example 3 except the foregoing.

Example 14

In Example 6, the amount of the AOPR20-1 used in the protective layer was changed from 0.3 part to 0.1 part. An electrophotographic photosensitive member of Example 14 was produced in the same manner as in Example 6 except the foregoing.

Example 15

In Example 7, the amount of the AOPR20-1 used in the protective layer was changed from 11.5 parts to 13 parts, and the amount of the compound represented by the structural formula (M-2) was changed from 9 parts to 7 parts. An electrophotographic photosensitive member of Example 15 was produced in the same manner as in Example 7 except the foregoing.

Comparative Example 1

A conductive layer, an undercoat layer, and a charge-generating layer were each formed in the same manner as in Example 1.

Next, the following materials were prepared.

| | |
|---|---|
| Compound represented by the structural formula (M-1) | 9 parts |
| Compound represented by the following structural formula (M-4) | 9 parts |
| 70 wt % solution of HAPR20-g-PCL in ethyl acetate | 1.65 parts |
| Siloxane-modified acrylic compound (product name: BYK-3550, manufactured by BYK Japan KK) | 0.2 part |
| Isocyanurate compound Duranate TPA-100 | 1.93 parts |

(M-4)

Those materials were dissolved in a mixed solvent of 36 parts of 2-propanol and 4 parts of tetrahydrofuran to prepare a coating liquid for a charge-transporting layer.

The coating liquid for a charge-transporting layer was applied onto the charge-generating layer by dip coating, and was dried at 120° C. for 1 hour to form a charge-transporting layer having a thickness of 15 μm. Thus, an electrophotographic photosensitive member of Comparative Example 1 was produced.

Comparative Example 2

A conductive layer, an undercoat layer, a charge-generating layer, and a charge-transporting layer were each formed in the same manner as in Example 2.

Next, the following materials were prepared.

| | |
|---|---|
| Compound represented by the structural formula (M-1) | 9 parts |
| Compound represented by the structural formula (M-4) | 9 parts |
| 70 wt % solution of HAPR20-g-PCL in ethyl acetate | 1.65 parts |
| Siloxane-modified acrylic compound (product name: BYK-3550, manufactured by BYK Japan KK) | 0.2 part |
| Isocyanurate compound Duranate TPA-100 | 1.93 parts |

Those materials were dissolved in a mixed solvent of 72 parts of 2-propanol and 8 parts of tetrahydrofuran to prepare a coating liquid for a protective layer.

The coating liquid for a protective layer was applied onto the charge-transporting layer by dip coating, and was dried at 120° C. for 1 hour to form a protective layer having a thickness of 3 μm. Thus, an electrophotographic photosensitive member of Comparative Example 2 was produced.

Comparative Example 3

A conductive layer, an undercoat layer, a charge-generating layer, and a charge-transporting layer were each formed in the same manner as in Example 2.

Next, the following materials were prepared.

| | |
|---|---|
| Compound represented by the structural formula (M-1) | 9 parts |
| Compound represented by the structural formula (M-2) | 9 parts |
| Modified polyrotaxane A | 1.1 parts |
| Siloxane-modified acrylic compound (product name: BYK-3550, manufactured by BYK Japan KK) | 0.2 part |

Those materials were dissolved in a mixed solvent of 72 parts of 2-propanol and 8 parts of tetrahydrofuran to prepare a coating liquid for a protective layer.

The coating liquid for a protective layer was applied onto the charge-transporting layer by dip coating to form a coating film, and the resultant coating film was dried for 4 minutes at 35° C. After that, under a nitrogen atmosphere, the coating film was irradiated with electron beams for 4.8 seconds under the conditions of an acceleration voltage of 57 kV and a beam current of 5.3 mA while a distance between the support (irradiation target body) and an electron beam irradiation window was set to 25 mm, and the support (irradiation target body) was rotated at a speed of 300 rpm. The absorbed dose of the electron beams at this time was measured to be 20 kGy. After that, under the nitrogen atmosphere, the heating of the coating film was performed by increasing its temperature from 25° C. to 137° C. over 10 seconds. An oxygen concentration during a period from the electron beam irradiation to the subsequent heating treatment was 10 ppm or less. Next, in the air, the coating film was naturally cooled until its temperature became 25° C., and heating treatment was performed for 10 minutes under such a condition that the temperature of the coating film became 100° C., thereby forming a protective layer having a thickness of 3 μm. Thus, an electrophotographic photosensitive member of Comparative Example 3 was produced.

The modified polyrotaxane A was synthesized by the following procedure. 20 Grams of a polyethylene glycol monostearic acid ester was bonded to 6 g of hexamethylene diisocyanate in toluene, followed by purification through recrystallization with an ether. 15 Grams of the resultant isocyanated polyethylene glycol monostearic acid ester was caused to react with 500 mg of the polyrotaxane (PR20) dissolved in dimethyl sulfoxide under room temperature overnight. After that, the reaction product was purified through reprecipitation with an ether, and was dried to provide the modified polyrotaxane A.

<Evaluation: Abrasion Resistance>

Abrasion resistance was evaluated by using each of the photosensitive members produced in Examples 1 to 15 and Comparative Examples 1 to 3 under the following conditions. A laser beam printer manufactured by Hewlett-Packard Company (product name: HP LaserJet Enterprise Color M553dn) was used as an evaluation apparatus, and its drive system was reconstructed so that the rotational speed of an electrophotographic photosensitive member became 350 mm/sec. Under a low-temperature and low-humidity environment having a temperature of 15° C. and a relative humidity of 10%, the produced electrophotographic photosensitive members were each mounted on a cartridge of the apparatus, and 10,000 sheets of paper were continuously passed by using an A4 test pattern having a print percentage of 1%.

A spectral interference displacement-type multilayer thickness-measuring instrument manufactured by Keyence Corporation (spectral unit: SI-T80) was used in thickness measurement. The thicknesses of the cylindrical electrophotographic photosensitive member in its generating line direction and peripheral direction were measured at intervals of 1 mm, and their average was calculated to determine the total thickness of the charge-transporting layer and protective layer of the photosensitive member. A difference between the thicknesses before and after the continuous paper passing was calculated as a shaved amount (μm). When the shaved amount was 0.2 μm or less, it was judged that the effect of the present disclosure was obtained.

<Evaluation: Fogging>

A laser beam printer (product name: HP LaserJet Enterprise Color M553dn, manufactured by Hewlett-Packard Company) was reconstructed so as to be capable of adjusting the charging potential (dark portion potential) of an electrophotographic photosensitive member. The reconstructed printer was used as an evaluation apparatus while the charging potential (dark portion potential) was set to −600 V.

The electrophotographic photosensitive members produced in the foregoing were each mounted on the process cartridge (cyan color) of the evaluation apparatus, and image output was performed on A4 size plain paper by using a test chart having a print percentage of 1% under an environment having a temperature of 23° C. and a relative humidity of 50%. The reflection density worst value F1 of the white ground portion of the output image and the average reflection density F0 of the plain paper before the image formation were measured, and the absolute value of F1-F0 was adopted as a fogging value. A reflection densitometer (product name: REFLECTOMETER MODEL TC-6DS, manufactured by Tokyo Denshoku Co., Ltd.) was used in density measurement. A smaller numerical value means that a suppressing effect on the occurrence of fogging is higher. In the present disclosure, evaluation criteria AA to D were defined as preferred levels, and an evaluation criterion E was defined as an unacceptable level.

AA: The fogging value was less than 1.0.
A: The fogging value was 1.0 or more and less than 1.5.
B: The fogging value was 1.5 or more and less than 2.0.
C: The fogging value was 2.0 or more and less than 2.5.
D: The fogging value was 2.5 or more and less than 5.0.
E: The fogging value was 5.0 or more.

The results of the evaluations of the abrasion resistance and the suppression of the occurrence of fogging are shown in Table 1 below.

TABLE 1

| | Outermost surface layer | Content of polyrotaxane with respect to total mass of the composition for outermost surface layer | Cyclic molecule of polyrotaxane | Linear molecule of polyrotaxane | Molecular weight of linear molecule | Shaved amount/μm | Fogging |
|---|---|---|---|---|---|---|---|
| Example 1 | Charge-transporting layer | 5% | α-Cyclodextrin | Polyethylene glycol | 20,000 | 0.12 | A |
| Example 2 | Protective layer | 5% | α-Cyclodextrin | Polyethylene glycol | 20,000 | 0.09 | AA |
| Example 3 | Protective layer | 5% | α-Cyclodextrin | Polyethylene glycol | 20,000 | 0.07 | AA |
| Example 4 | Protective layer | 5% | α-Cyclodextrin | Polyethylene glycol | 20,000 | 0.13 | AA |
| Example 5 | Protective layer | 21% | α-Cyclodextrin | Polyethylene glycol | 20,000 | 0.11 | A |
| Example 6 | Protective layer | 1% | α-Cyclodextrin | Polyethylene glycol | 20,000 | 0.15 | B |
| Example 7 | Protective layer | 40% | α-Cyclodextrin | Polyethylene glycol | 20,000 | 0.13 | A |
| Example 8 | Protective layer | 5% | α-Cyclodextrin | Polyethylene glycol | 5,000 | 0.08 | A |
| Example 9 | Protective layer | 5% | α-Cyclodextrin | Polyethylene glycol | 35,000 | 0.07 | AA |
| Example 10 | Protective layer | 5% | β-Cyclodextrin | Polypropylene glycol | 5,000 | 0.13 | A |
| Example 11 | Protective layer | 5% | γ-Cyclodextrin | Polypropylene glycol | 5,000 | 0.09 | B |
| Example 12 | Protective layer | 5% | β-Cyclodextrin | Polybutadiene | 2,800 | 0.11 | B |
| Example 13 | Protective layer | 5% | α-Cyclodextrin | Polyethylene glycol | 20,000 | 0.05 | AA |
| Example 14 | Protective layer | 0.4% | α-Cyclodextrin | Polyethylene glycol | 20,000 | 0.18 | B |
| Example 15 | Protective layer | 47% | α-Cyclodextrin | Polyethylene glycol | 20,000 | 0.17 | B |
| Comparative Example 1 | Charge-transporting layer | 5% | α-Cyclodextrin | Polyethylene glycol | 20,000 | 0.27 | E |
| Comparative Example 2 | Protective layer | 5% | α-Cyclodextrin | Polyethylene glycol | 20,000 | 0.23 | E |
| Comparative Example 3 | Protective layer | 5% | α-Cyclodextrin | Polyethylene glycol | 20,000 | 0.28 | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-014145, filed Jan. 30, 2020, which is hereby incorporated by reference herein in its entirety.

What is claimed is:

1. An electrophotographic photosensitive member comprising:
a support; and
a photosensitive layer arranged on the support,
wherein an outermost surface layer of the electrophotographic photosensitive member comprises a polymerized product obtained by polymerization of a composition comprising a polyrotaxane and a monomer having (meth)acryloyloxy groups, and
wherein the polyrotaxane comprises chain molecules and cyclic molecules,
the chain molecules each have two blocking groups at both terminals thereof,
the cyclic molecules each have (meth)acryloyloxy groups,
the monomer is represented by the formula (M-2):

(M-2)

and
the polymerized product comprises a crosslinked polyrotaxane obtained by forming a bond between the (meth)acryloyloxy groups in the cyclic molecules of the polyrotaxane and the (meth)acryloyloxy groups in the monomer.

2. The electrophotographic photosensitive member according to claim 1, wherein the outermost surface layer is a protective layer.

3. The electrophotographic photosensitive member according to claim 1, wherein a content of the polyrotaxane is 1 to 40 mass % with respect to a total mass of the composition.

4. The electrophotographic photosensitive member according to claim 1, wherein the cyclic molecules are molecules obtained by introducing a (meth)acryloyloxy group into a-cyclodextrin molecules, and the chain molecules are polyethylene glycol molecules.

5. A process cartridge comprising:
an electrophotographic photosensitive member; and
at least one unit selected from the group consisting of a charging unit, a developing unit, and a cleaning unit,
the process cartridge integrally supporting the electrophotographic photosensitive member and the at least one unit, and being removably mounted onto a main body of an electrophotographic image forming apparatus,
wherein the electrophotographic photosensitive member comprises a support and a photosensitive layer arranged on the support,
wherein an outermost surface layer of the electrophotographic photosensitive member comprises a polymerized product obtained by polymerization of a composition comprising a polyrotaxane and a monomer having (meth)acryloyloxy groups, and
wherein of the polyrotaxane comprises chain molecules and cyclic molecules,
the chain molecules each have two blocking groups at both terminals thereof,
the cyclic molecules each have (meth)acryloyloxy groups,
the monomer is represented by the formula (M-2):

(M-2)

and
the polymerized product comprises a crosslinked polyrotaxane obtained by forming a bond between the (meth)acryloyloxy groups in the cyclic molecules of the polyrotaxane and the (meth)acryloyloxy groups in the monomer.

6. An electrophotographic image forming apparatus comprising:
an electrophotographic photosensitive member; and
at least one unit selected from the group consisting of a charging unit, an exposing unit, a developing unit, and a transferring unit,
wherein the electrophotographic photosensitive member comprises a support and a photosensitive layer arranged on the support,
wherein an outermost surface layer of the electrophotographic photosensitive member comprises a polymerized product obtained by polymerization of a composition comprising a polyrotaxane and a monomer having (meth)acryloyloxy groups,
the monomer is represented by the formula (M-2):

(M-2)

and
wherein the polyrotaxane comprises chain molecules and cyclic molecules,
the chain molecules each has two blocking groups at both terminals thereof,
the cyclic molecules each has (meth)acryloyloxy groups, and
the polymerized product comprises a crosslinked polyrotaxane obtained by forming a bond between the (meth)acryloyloxy groups in the cyclic molecules of the polyrotaxane and the (meth)acryloyloxy groups in the monomer.

\* \* \* \* \*